(12) United States Patent
Gross

(10) Patent No.: US 6,412,196 B1
(45) Date of Patent: Jul. 2, 2002

(54) CONTOURED PLATFORM AND FOOTWEAR MADE THEREFROM

(75) Inventor: Alexander L. Gross, 146 Ardmore Dr., Aspen, CO (US) 81611

(73) Assignee: Alexander L. Gross, Aspen, CO (US)

( * ) Notice: Subject to any disclaimer, the term of this patent is extended or adjusted under 35 U.S.C. 154(b) by 0 days.

(21) Appl. No.: 09/490,811

(22) Filed: Jan. 26, 2000

Related U.S. Application Data

(60) Provisional application No. 60/126,277, filed on Mar. 26, 1999.

(51) Int. Cl.[7] ............................................... A43B 13/12
(52) U.S. Cl. .......................... 36/102; 36/30 R; 36/59 R
(58) Field of Search ............................... 36/102, 30 R, 36/59 R, 107, 108, 28, 31, 103, 25 R, 67 R, 67 A, 59 C, 73

(56) References Cited

U.S. PATENT DOCUMENTS

| | | | |
|---|---|---|---|
| 3,812,604 A | * | 5/1974 | Sato |
| 4,246,708 A | | 1/1981 | Gladek |
| 4,551,930 A | * | 11/1985 | Graham et al. |
| 4,676,010 A | * | 6/1987 | Cheskin |
| 5,014,449 A | | 5/1991 | Richard et al. |
| 5,052,130 A | * | 10/1991 | Barry et al. |
| 5,185,943 A | * | 2/1993 | Tong et al. |
| 5,408,761 A | * | 4/1995 | Gazzano |
| 5,493,792 A | | 2/1996 | Bates et al. |
| 5,528,842 A | | 6/1996 | Ricci et al. |
| 5,625,963 A | | 5/1997 | Miller et al. |
| 5,647,145 A | * | 7/1997 | Russell et al. |
| 5,832,634 A | * | 11/1998 | Wong |
| 5,979,083 A | * | 11/1999 | Robinson et al. |

FOREIGN PATENT DOCUMENTS

WO     WO 96/04811     2/1996

* cited by examiner

*Primary Examiner*—Ted Kavanaugh
(74) *Attorney, Agent, or Firm*—Foley & Lardner

(57) ABSTRACT

A contoured platform to be used in an article of footwear includes a contoured inner and outer surface, the inner and outer surface defining at least one integral portion, the integral portion including a curved arch portion and/or a raised portion, such that the contoured inner and outer surfaces extend beyond the arch of the footwear, either extending forward of the arch of the footwear, extending behind the arch of the footwear, or extending in both directions beyond the arch of the footwear. The outer surface of the contoured platform may be configured to have at least one outsole component attached to it, and at least a portion of an exterior bottom surface of the contoured platform may be formed to serve as a portion of an exterior bottom surface of the article of footwear. Articles of footwear and sole assemblies are constructed using the contoured platforms according to the present invention.

47 Claims, 14 Drawing Sheets

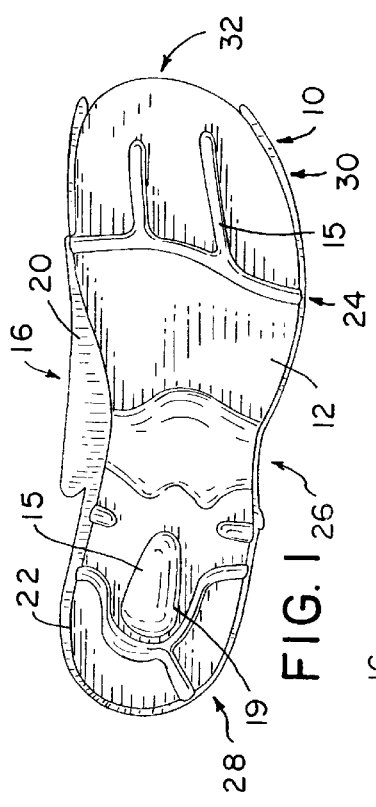
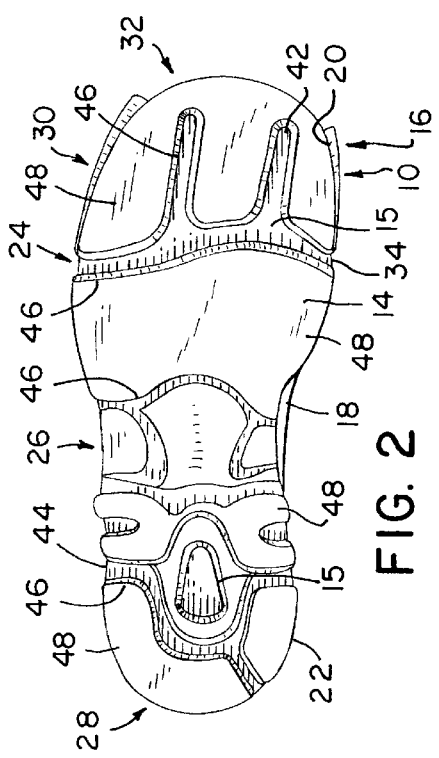
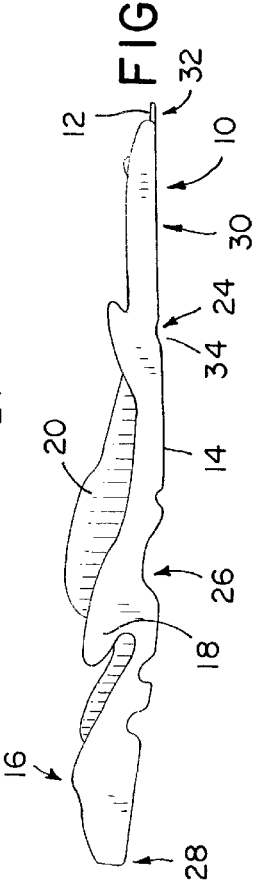
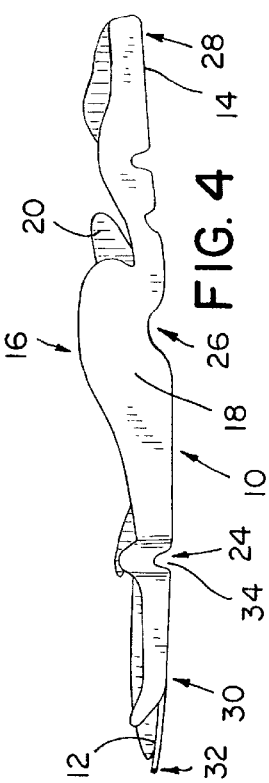
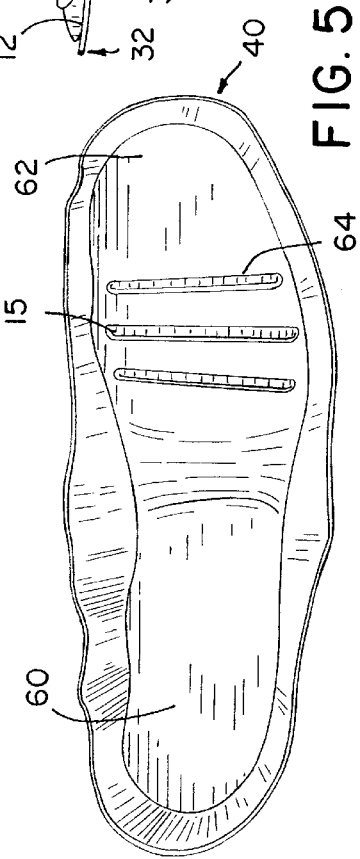

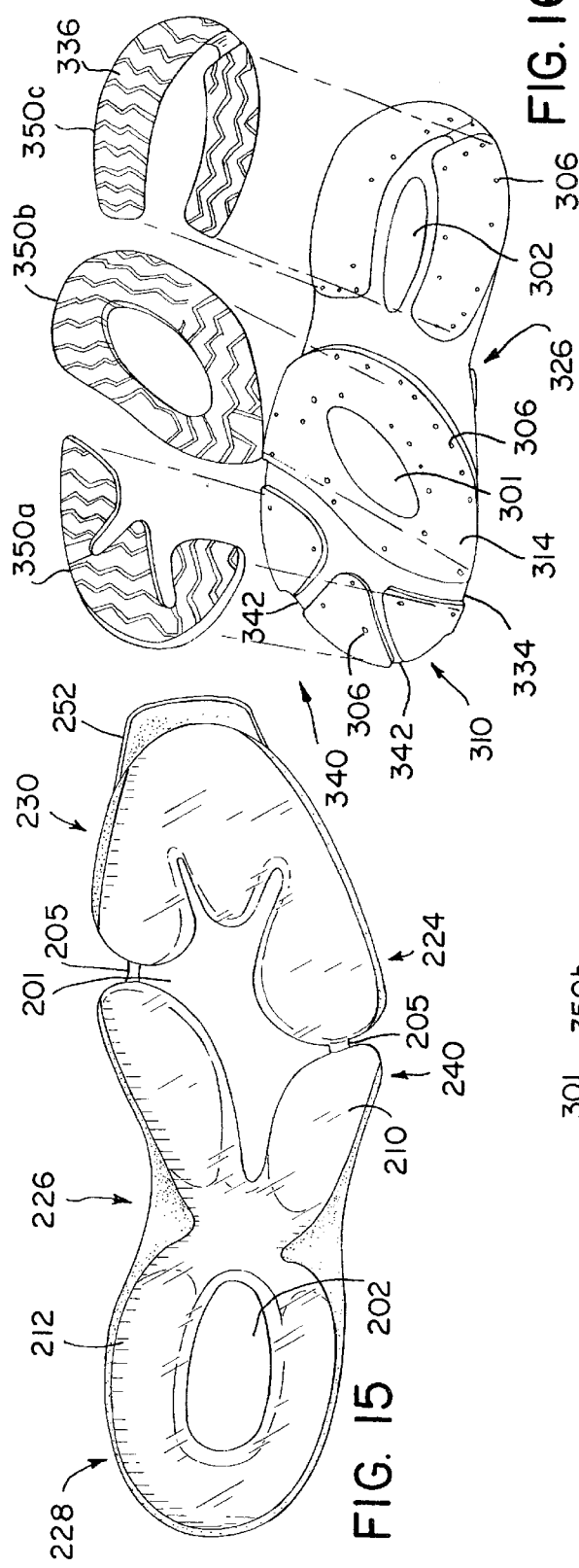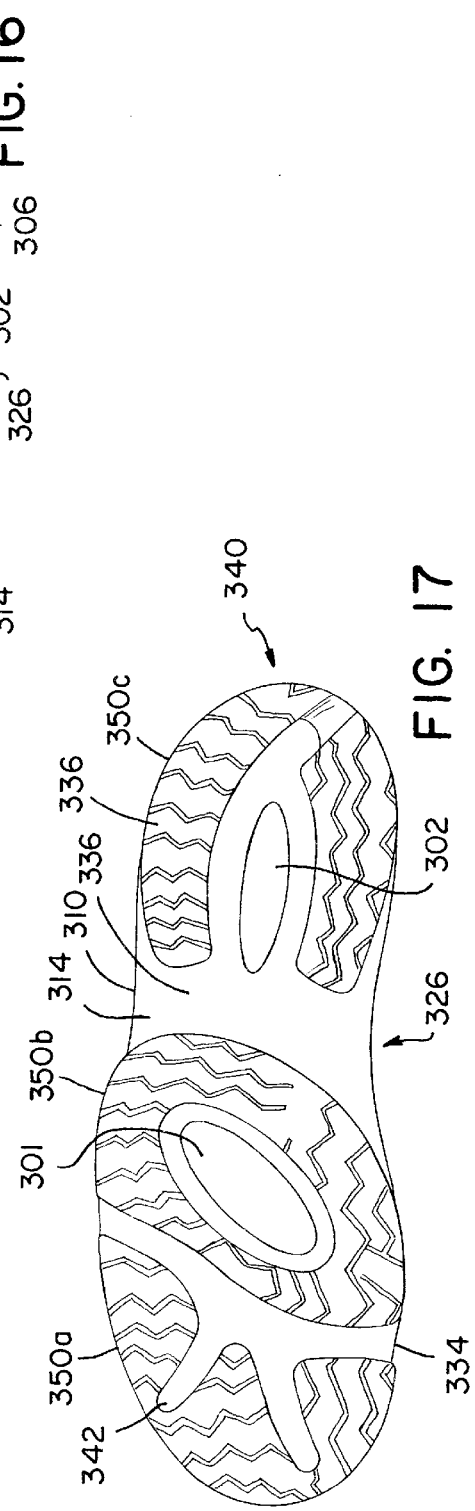

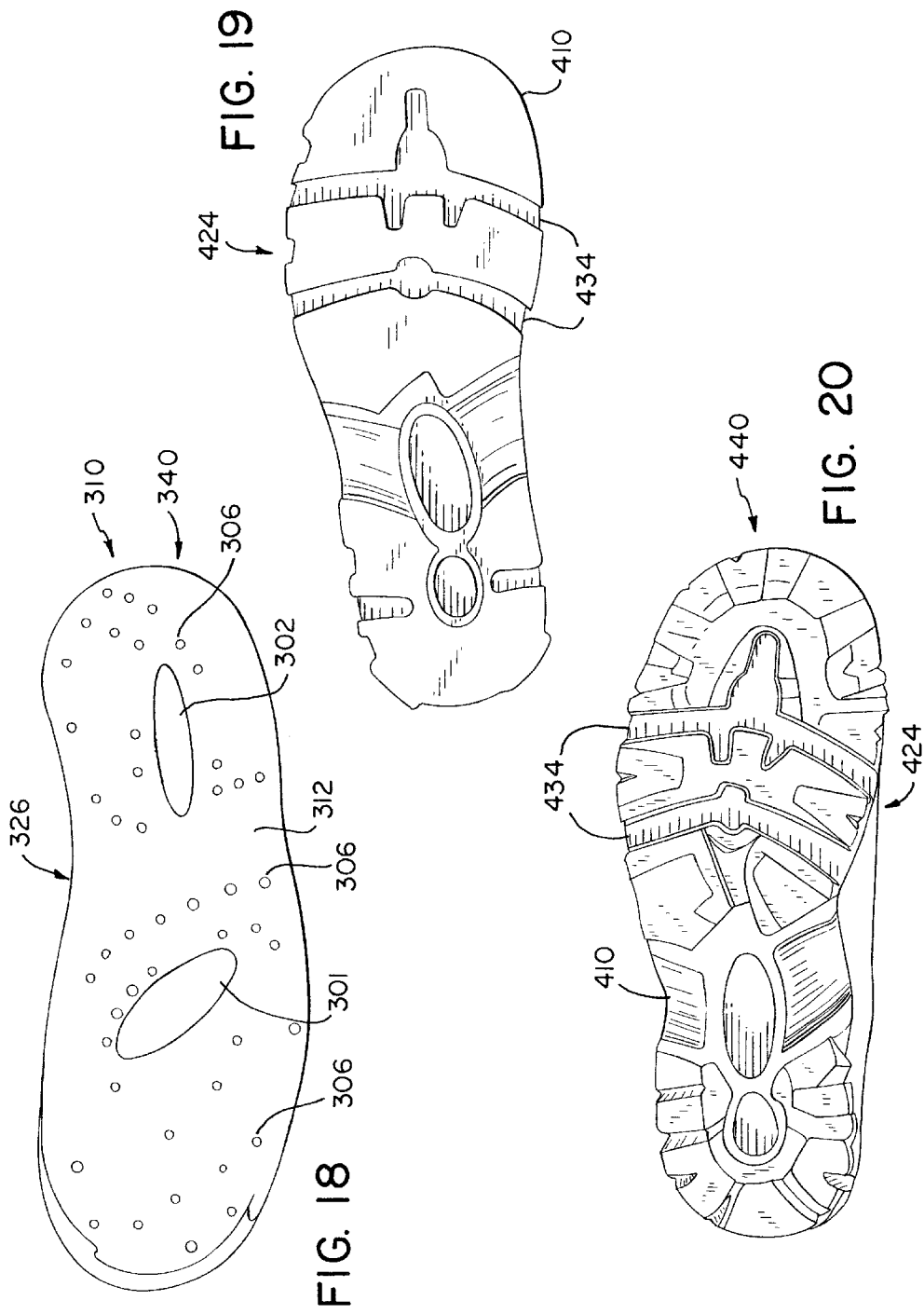

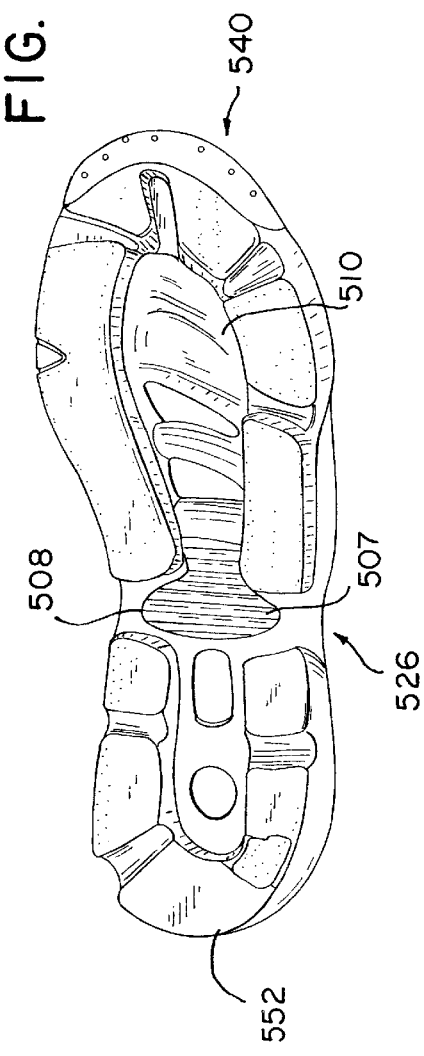
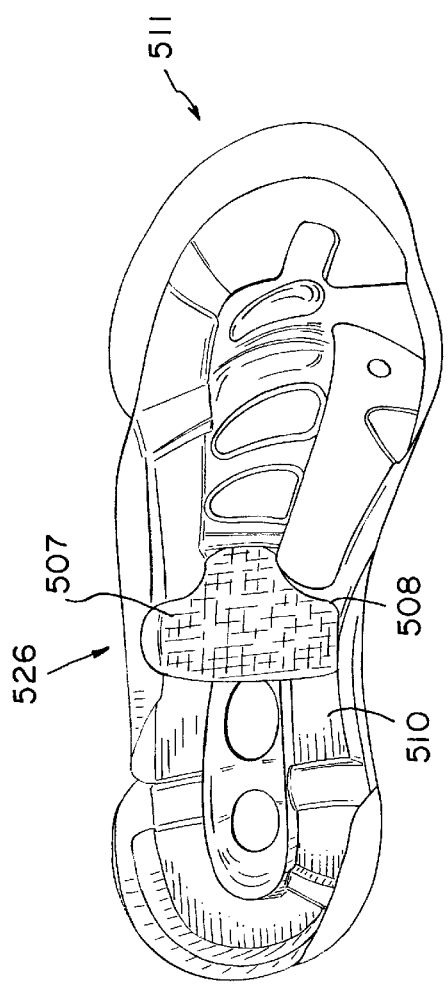
FIG. 21
FIG. 22

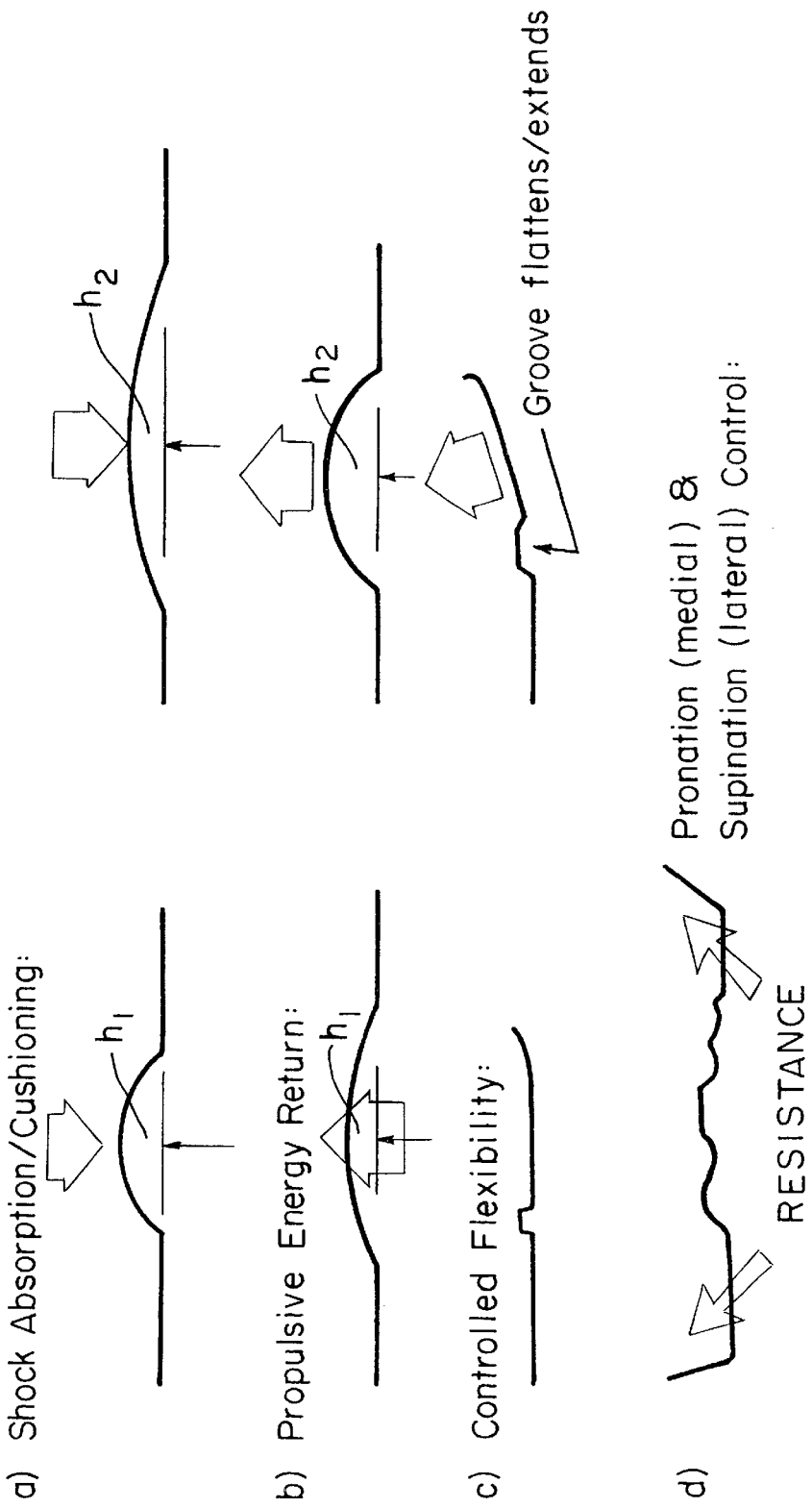

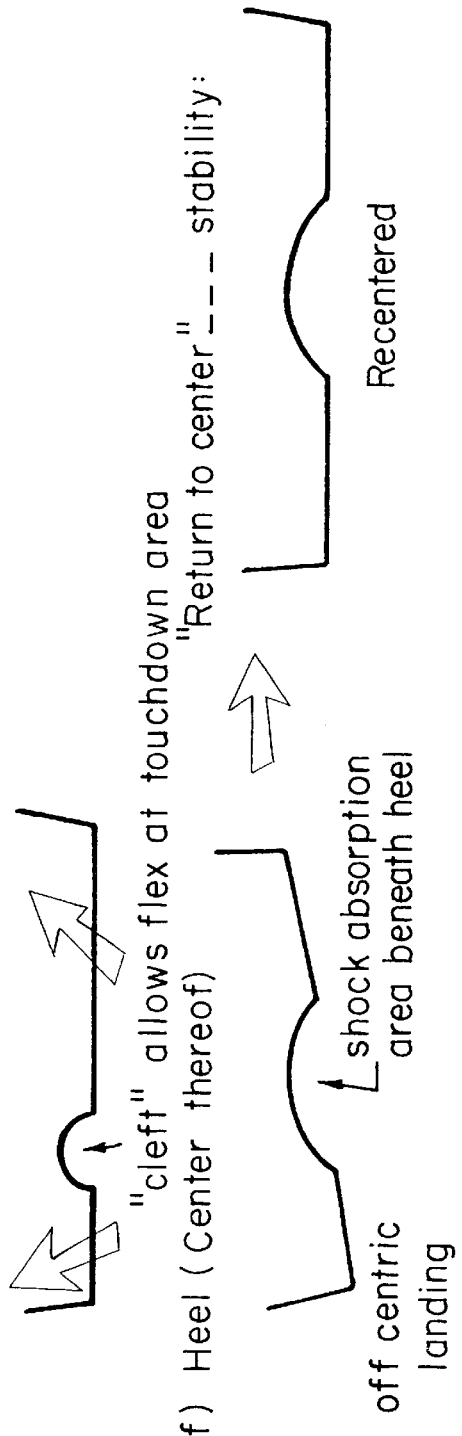
FIG. 25 (cont.)

FIG. 25 (cont.)
h) Independent heel & forefoot "strike pads": Longitudinal cross-sec.
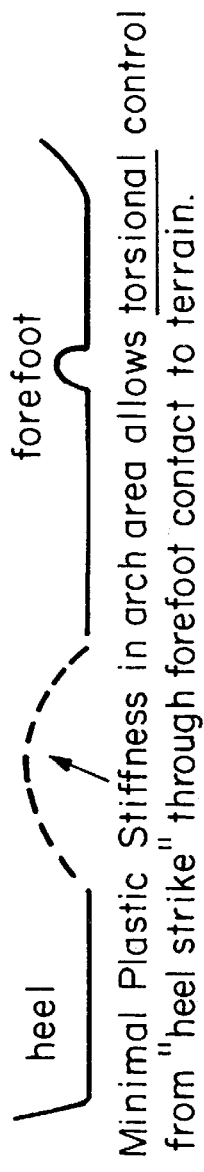
Minimal Plastic Stiffness in arch area allows torsional control from "heel strike" through forefoot contact to terrain.
i) Stone/pebble "strike through" eliminated by stiffness of platform in forefoot area:
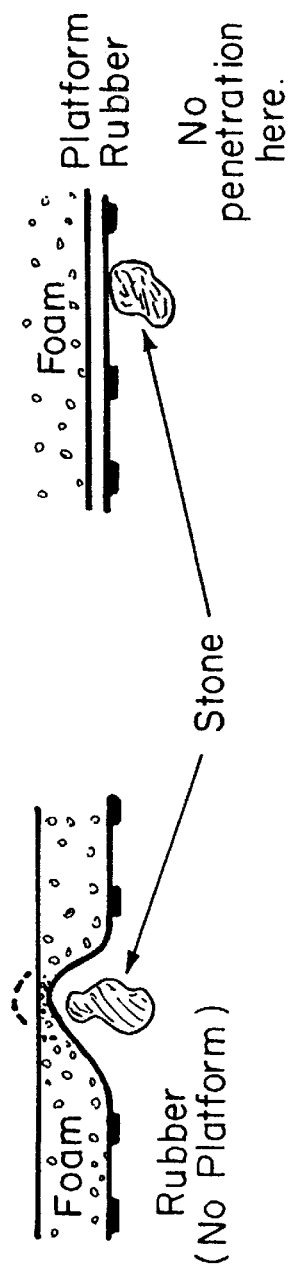

CONTOURED PLATFORM AND FOOTWEAR MADE THEREFROM

REFERENCE TO RELATED APPLICATION

This application claims the benefit of Provisional Patent Application No. 60/126,277 filed Mar. 26, 1999, the entire disclosure of which is incorporated by reference.

FIELD OF THE INVENTION

The present invention relates to footwear construction and more particularly relates to a contoured platform for use in the construction of an article of footwear, to articles of footwear and sole assemblies constructed therefrom, and to a method for manufacturing the contoured platform.

BACKGROUND OF THE INVENTION

Humans have worn various types of footwear since prehistoric times in order to protect their feet from the elements and rough or sharp surfaces while walking, running, or relaxing around the home. Many improvements have been made in the construction and design of articles of footwear since that time.

Several problems still challenge those involved in the design and construction of footwear. One problem that has perpetually challenged those associated with the design and construction of footwear is how to design an article of footwear that provides increased stability to the foot of the wearer while retaining flexibility so that the article of footwear does not impede the natural movement of the foot while walking or running. Although stability and flexibility are important features in most articles of footwear, these features are particularly important in articles of footwear designed for long distance running, sprinting, long distance walking, walking over uneven surfaces, and use in athletic events.

Generally, articles of footwear designed to provide increased stability to the foot of a wearer have a decreased amount of flexibility as the rigidity of the article of footwear generally decreases the flexibility of the footwear.

Another challenge facing those involved in the design and construction of footwear is how to prevent sharp objects from penetrating from the bottom exterior of the footwear to the foot of the wearer while retaining a lightweight and flexible article of footwear. Generally, improvements in puncture resistance and stability lead to shoes or boots that have increased weights such that they may be uncomfortable or unsuitable for their intended purpose.

Thus, a need exists for a contoured platform that imparts increased stability while maintaining or increasing flexibility in articles of footwear constructed from the platform. A need also remains for an article of footwear constructed from a contoured platform and for a method of constructing a contoured platform that provides stability while retaining or increasing flexibility.

SUMMARY OF THE INVENTION

It would be highly advantageous to be able to produce a contoured platform that imparts stability while retaining or increasing flexibility in articles of footwear produced therefrom. It would also be highly advantageous to have a method for producing an article of footwear that includes such a contoured platform. The invention thus provides a contoured platform, articles of footwear and sole assemblies that include the contoured platform, and a method for producing a contoured platform and articles of footwear and sole assemblies constructed therefrom.

One embodiment of the contoured platform for use in the construction of an article of footwear according to the present invention includes a contoured inner and outer surface, such that the inner and outer surface defines at least one integral portion, the integral portion including a curved arch portion and/or a raised portion, such that the contoured inner and outer surfaces extend beyond the arch of the footwear, in one embodiment extending forward of the arch of the footwear, in another embodiment extending behind the arch of the footwear, and in another embodiment, extending in both directions beyond the arch of the footwear. In one embodiment, the contoured platform includes one or more integral raised portions and/or a curved arch portion together with at least one integral peripheral flange that includes an exterior and interior flange surface. In one embodiment, at least one of the integral raised portions is in the shape of a groove or cavity. In one embodiment, the outer surface of the contoured platform is configured to have at least one outsole component attached to it and at least a portion of the outer surface of the platform is formed to serve as a portion of an exterior bottom surface of the article of footwear. In another embodiment, the contoured platform is entirely encased within the article of footwear, typically within the midsole portion of the article of footwear. The contoured platform has a rigidity sufficient to provide a framework for use in constructing the article of footwear, and the exterior flange surface of the lateral peripheral flange, if present, may be shaped to serve as an exterior portion of a side of the article of footwear.

In one embodiment, the contoured platform includes a flexible metatarsal-phalangeal juncture portion while other embodiments of contoured platforms include an arch portion and a metatarsal-phalangeal juncture portion and the contoured platform extends from at least the arch portion to at least the metatarsal-phalangeal juncture portion. In another platform, the platform also includes a heel portion and the contoured platform extends from at least the heel portion to the metatarsal-phalangeal juncture portion. In another platform, the platform includes an end-of-toe portion and the contoured platform extends from at least the arch portion to the end-of-toe portion while in still other preferred platforms the platform extends from the heel portion to the end-of-toe portion.

In some platform embodiments, the outer surface of the contoured platform defines a groove in the metatarsal-phalangeal juncture portion of the platform while in still more preferred platforms, the groove is adapted to serve as a portion of the exterior bottom surface of the article of footwear and provides flexibility to the metatarsal-phalangeal juncture portion of the contoured platform. In still further preferred platforms, the arch portion of the contoured platform is configured to serve as a portion of the exterior bottom surface of the article of footwear.

Some contoured platforms are made of a synthetic polymeric material while other preferred platforms are made of injection-molded or compression-molded plastic. In various platforms, the contoured platform has a non-uniform thickness while in other platforms the contoured inner and outer surfaces define a plurality of orifices that extend through the contoured platform. In still other platforms, at least a portion of the contoured platform includes a composite textile material.

Various platforms of the present invention have an outer surface adapted to have at least two separate outsole components attached thereto whereas other preferred platforms have an outer surface adapted to have at least three separate outsole components attached thereto.

In still other contoured platforms, the outer surface of the platform includes at least one flexural zone that provides flexibility to the platform while in still other preferred platforms, the inner surface defines at least one depression adapted to hold a cushioning substance on a projection of a midsole.

A contoured platform that provides improved stability while retaining flexibility in an article of footwear constructed from the contoured platform includes: a contoured inner surface; a contoured outer surface; a flexible metatarsal-phalangeal juncture portion; a phalangeal portion; and an arch portion. The contoured platform extends from at least the arch portion to at least the metatarsal-phalangeal juncture portion. At least a portion of the outer surface of the contoured platform in the metatarsal-phalangeal juncture portion is configured to have at least one outsole component attached thereto. At least a portion of the outer surface of the contoured platform in the metatarsal phalangeal juncture portion is formed to serve as an exterior bottom surface of the article of footwear, and the contoured platform has a rigidity sufficient to provide a framework for use in constructing the article of footwear.

Another embodiment of the contoured platform that provides stability while retaining flexibility in an article of footwear further includes a heel portion, and the contoured platform extends from at least the heel portion to at least the metatarsal-phalangeal juncture portion. Other contoured platforms include a lateral peripheral edge positioned at an angle of greater than about 45° measured from an adjacent portion of the contoured platform. The contoured platform is some embodiments is made of a synthetic plastic material, injection-molded plastic, compression molded plastic or a non-compressible material.

In still other contoured platforms that provide improved stability while retaining flexibility in an article of footwear, the metatarsal-phalangeal juncture portion defines a groove providing flexibility in the contoured platform whereas in other preferred platforms the outer surface of the contoured platform is configured to have at least two separate outsole components attached thereto.

Other contoured platforms that provide improved stability while retaining flexibility in an article of footwear, include a heel portion, and in still other platforms at least a portion of the outer surface of the heel portion is configured to have at least one outsole component attached thereto and at least another portion of the outer surface is configured to serve as the exterior bottom portion of the article of footwear. In other platforms, the inner and outer surfaces of the contoured platform define at least two orifices that extend through the contoured platform while in still other platforms, the inner surface of the contoured platform defines at least one depression adapted to hold a cushioning substance on a projection of a midsole.

An article of footwear with a contoured platform includes an exterior bottom surface; an exterior side surface; a sole assembly; and an upper main body. The sole assembly of the article of footwear includes an outsole having an interior and an exterior surface; a contoured platform including a contoured inner and outer surface and at least one lateral peripheral flange having an interior and exterior flange surface; and an upper main body. At least a portion of the outer surface of the contoured platform is attached to the outsole, and the exterior surface of the outsole forms at least a portion of the exterior bottom surface of the article of footwear. Additionally, at least a portion of the outer surface of the contoured platform makes up a portion of the exterior bottom surface of the article of footwear. The exterior flange surface of the contoured platform serves as at least a portion of the exterior side surface of the article of footwear. The sole assembly is attached to the main body of the article of footwear and provides a stabilizing framework in the article of footwear.

In one embodiment of articles of footwear, the outsole includes at least two separate unattached pieces while in other articles of footwear, the outsole includes at least three separate unattached pieces. In still other articles of footwear, the outsole includes at least two separate pieces that are attached to each other by a narrow bridging section. In anther article of footwear, the contoured platform is encased entirely by the article of footwear, so that no part of the contoured footwear remains visible from the outside of the finished footwear article. In still another embodiment, the top and bottom surfaces of the contoured platform are entirely encased by the article of footwear and only some or all of the side portions of the contoured platform are visible from the outside of the finished footwear article.

One article of footwear includes a contoured platform with a metatarsal-phalangeal juncture portion that defines a groove on the exterior bottom surface of the article of footwear. In other articles of footwear, the sole assembly includes a midsole attached to at least a portion of the interior surface of the contoured platform, and in still other articles of footwear, the midsole includes a cushioning substance that fits into a corresponding contour on the inner surface of the contoured platform. The cushioning substance in such articles of footwear is any suitable material, including, a foam, a gel, a gas, a liquid, a spongy material, or mixtures of these.

Certain articles of footwear include an interstitial fabric layer positioned between at least a portion of the inner surface of the contoured platform and at least a portion of the midsole while in other articles of footwear the interstitial fabric layer is positioned between at least a portion of the inner surface of the contoured platform and at least a portion of the outsole.

In still other articles of footwear, the contoured platform has an arch portion and a metatarsal-phalangeal juncture portion and the contoured platform extends from at least the arch portion to at least the metatarsal-phalangeal juncture portion. In yet other articles of footwear, the article of footwear includes a front side having an exterior surface and the contoured platform includes an end-of-toe portion. In such articles of footwear, a toe piece of the outsole preferably extends over the end-of-toe portion of the contoured platform to form an exterior surface on the front side of the article of footwear.

In some articles of footwear, the contoured platform is a plastic material that provides both rigidity and flexibility to the article of footwear.

A sole assembly according to the present invention includes an exterior side surface; an outsole having an interior and an exterior surface; and a contoured platform including a contoured inner and outer surface and a lateral peripheral flange including an interior and exterior flange surface. The exterior surface of the outsole forms at least a portion of the exterior bottom surface of the sole assembly, and at least a portion of the contoured platform is attached to the outsole. At least a portion of the outer surface of the contoured platform includes a portion of the exterior bottom surface of the sole assembly, and the contoured platform provides a rigid framework to the sole assembly. At least a portion of the exterior flange surface serves as at least a portion of the exterior side surface of the sole assembly.

On embodiment of a sole assembly includes a midsole attached to at least a portion of the interior surface of the contoured platform. In another embodiment of a sole assembly, the midsole includes a cushioning substance that fits into a corresponding contour on the inner surface of the contoured platform. In still more preferred sole assemblies, the cushioning substance is a foam, a gel, a gas, a liquid, a spongy material, or mixtures of these.

In other sole assemblies, the outsole includes at least two separate unattached pieces while in other sole assemblies, the outsole includes at least three separate unattached pieces. In still other sole assemblies, at least two of the separate pieces of the outsole are attached to each other by a narrow bridging section.

In yet other sole assemblies, the contoured platform includes a metatarsal-phalangeal juncture portion that defines a groove on the exterior bottom surface of the sole assembly that may be at least a portion of the exterior bottom surface of the sole assembly.

In still other sole assemblies, the contoured platform includes an arch portion and a metatarsal-phalangeal juncture portion and the contoured platform extends from at least the arch portion to at least the metatarsal-phalangeal juncture portion.

In still other sole assemblies, the contoured platform is a plastic material that provides both rigidity and flexibility to the article of footwear. In still other sole assemblies, the sole assembly includes a front side having an exterior surface; the outsole includes at least one toe piece; and the contoured platform includes an end-of-toe portion. In these sole assemblies, the toe piece of the outsole extends over the end-of-toe portion of the contoured platform to form an exterior surface of the front side of the sole assembly.

Other sole assemblies include a contoured platform with a metatarsal-phalangeal juncture defining a groove on the exterior bottom surface of the sole assembly. In such a sole assembly, the sole assembly preferably includes a phalangeal portion that defines a groove on the exterior bottom surface of the sole assembly.

A contoured platform for use in constructing an article of footwear includes: a contoured inner surface; a contoured outer surface; a flexible metatarsal-phalangeal juncture portion; and an arch portion, such that all are integrally connected. The contoured platform extends from at least the arch portion to at least the metatarsal-phalangeal juncture portion, and at least 50 percent of the outer surface of the contoured platform is configured to have an outsole component attached to it. The metatarsal-phalangeal juncture portion defines a groove on the outer surface of the contoured platform, and the contoured platform has a rigidity sufficient to provide a framework for use in constructing the article of footwear.

In some contoured platforms, at least about 75 percent of the outer surface of the contoured platform is configured to have an outsole component attached to it, whereas in other contoured platforms, at least about 90 percent, or at least about 95 percent, of the outer surface of the contoured platform is configured to have an outsole component attached to it. In yet other preferred contoured platforms, all the outer surface of the contoured platform is configured to have an outsole component attached to it.

Some embodiments of contoured platforms include a lateral peripheral flange with an interior and an exterior flange surface, and the exterior surface of the flange is shaped to serve as an exterior portion of a side of the article of footwear.

Some contoured platforms extend from at least a heel portion to at least the metatarsal-phalangeal juncture portion while other preferred platforms include a phalangeal portion and the contoured platform extends from at least the heel portion to at least the phalangeal portion. In still other contoured platforms, the platform extends from at least the arch portion to at least an end-of-toe portion whereas other preferred platforms extend from at least a heel portion to at least the end-of-toe portion.

In some contoured platforms, the contoured platform is made of an injection-molded or synthetic plastic material while in others at least a portion of the platform is made of a textile material. In still other contoured platforms, the outer surface and the inner surface of the contoured platform define at least two orifices.

A method for making contoured platforms for use in the construction of an article of footwear includes injecting an injection molding material into a mold configured to produce the contoured platform; cooling the injection molding material; and removing the contoured platform from the mold.

Another method for making contoured platforms according to the present invention includes a compression molding method. In such a method a sheet of plastic or composite material is placed on a series of pins on a compression mold designed to form a contoured platform according to the invention. The method also includes closing the compression mold and applying pressure to produce the contoured platform. In some embodiments, a midsole, an outsole, or both may be placed in the mold prior to compression to provide a midsole/contoured platform assembly, a outsole/contoured platform assembly, or a midsole/contoured platform/outsole assembly.

Further objects, features and advantages of the invention will be apparent from the following detailed description when taken in conjunction with the drawings.

BRIEF DESCRIPTION OF THE DRAWINGS

An exemplary embodiment of the invention will hereinafter be described in conjunction with the appended drawings, wherein like numerals denote like elements and:

FIG. 1 is a top view of a contoured platform according to the present invention;

FIG. 2 is a bottom view of the contoured platform shown in FIG. 1;

FIG. 3 is a right side view of the contoured platform shown in FIG. 1;

FIG. 4 is a left side view of the contoured platform shown in FIG. 1;

FIG. 5 is a top view of a midsole/contoured platform/outsole sole assembly manufactured from the contoured platform shown in FIGS. 1–4 and used to make an article of footwear according to the present invention;

FIG. 15 is a top view of the contoured platform/outsole sole assembly shown in FIG. 14;

FIG. 16 is an exploded view of a contoured platform/outsole sole assembly manufactured from a fourth alternative embodiment of a contoured platform according to the present invention showing how separate outsole pieces are placed on a contoured platform to make the contoured/outsole sole assembly;

FIG. 17 is a bottom view of the contoured platform/outsole sole assembly made from the outsole and contoured platform components shown in FIG. 16;

FIG. 18 is a top view of the contoured platform/outsole sole assembly shown in FIG. 17;

FIG. 19 is a bottom view of a fifth alternative embodiment of a contoured platform according to the present invention;

FIG. 20 is a bottom view of a contoured platform/outsole sole assembly made using the contoured platform shown in FIG. 19;

FIG. 21 is a bottom view of a contoured platform/outsole sole assembly with a reinforcing composite textile in the arch area made from a sixth alternative embodiment of a contoured platform according to the present invention;

FIG. 22 is a top view of the contoured platform/outsole sole assembly shown in FIG. 21;

FIGS. 25a–25i are cross-sectional views of various bio-mechanical advantages of the contoured platforms of the present invention.

DETAILED DESCRIPTION OF THE INVENTION

Figure 6:
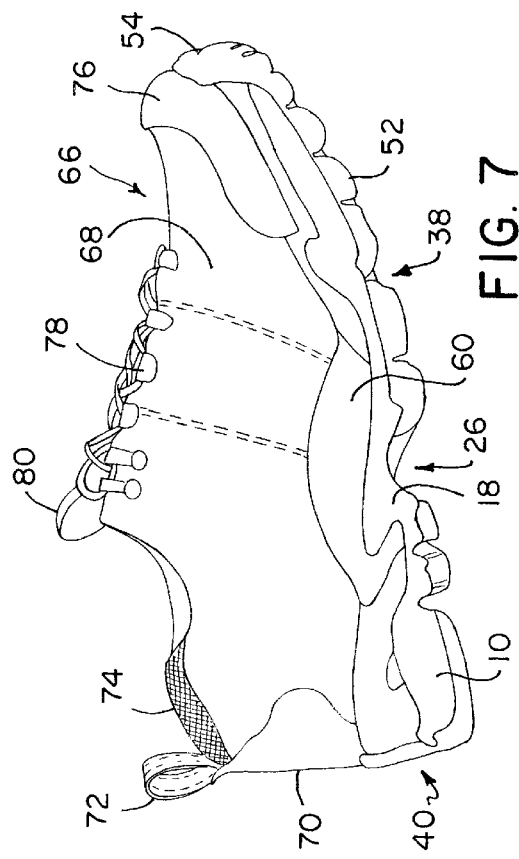
FIG. 6 is a bottom perspective view of an article of footwear including the contoured platform shown in FIGS. 1–4.

A contoured platform of the present invention is generally useful in the construction of an article of footwear or sole assembly. In one embodiment, all parts of the contoured platform are created from the same material and are integrally connected. The contoured platform provides stability to an article of footwear or sole assembly constructed from it while retaining or increasing flexibility in the article of footwear or sole assembly. However, the rigidity of the contoured platform is generally sufficient to provide a framework for use in constructing the article of footwear or sole assembly.

A contoured platform 10 as shown in FIGS. 1–4 includes a contoured inner surface 12 and a contoured outer surface 14. The contoured platform acts as a bio-mechanic platform. As a bio-mechanical platform, the contoured platform serves a number of useful purposes when incorporated into an article of footwear. As shown in attached FIG. 25, the contoured platform provides numerous bio-mechanical advantages to an article of footwear, including, but not limited to: (a) increased rigidity; (b) increased flexibility; (c) shock absorption and cushioning; (d) propulsive energy return; (e) controlled flexibility; (f) pronation/supination control; (g) increased compliance of heel to terrain at the point where the heel of the footwear touches down, i.e., the "heelstrike" position; (h) increased heel (calcaneus) stability after the heel touches down; (i) increased lateral stability at the forefoot area of the footwear incorporating the contoured platform, helping to prevent "roll-over"; (j) independent heel and forefoot ground reaction strike pads for improved compliance to varied terrain; and (k) prevention of stone/pebble "strike through" in the forefoot area of the contoured platform.

A number of features of the contoured platform allow for these bio-mechanical advantages. For example, one or more grooves strategically placed within the contoured platform allow not only increased flexibility, but allow for a controlled flexibility when placed in portions of the contoured platform as discussed herein. Moreover, the contoured platform in one embodiment is made of a relatively stiff, yet flexible material, which allows for increased lateral stability and propulsive energy return when incorporated into an article of footwear. Further, some embodiments of the contoured platform add stability to the heel portion of the footwear article when worn, by providing a "return to center" of the calcaneus between the lateral and medial stabilizing pillars of the contoured platform.

The contoured platform is not a flat insert, or merely an insert that is shaped in a single dimension. Rather, the contoured platform of the present invention is shaped along all three axis.

The contoured platform 10 includes a curved arch portion 26, and includes the contoured inner surface 12 and the contoured outer surface 12 which extend beyond the curved arch portion 26. In one embodiment, contoured platform 10 also includes at least one integral raised portion 15, preferably in the shape of a groove 34, as shown in FIG. 2. The raised portion 15 may occur at for various purposes in the contoured platform 10. The raised portion 15 may serve to increase flexibility of the contoured platform 10, as illustrated by grooves 34 in FIG. 1, or for esthetic purposes, as illustrated by a decorative portion 19, also as shown in FIG. 1.

Figure 9:
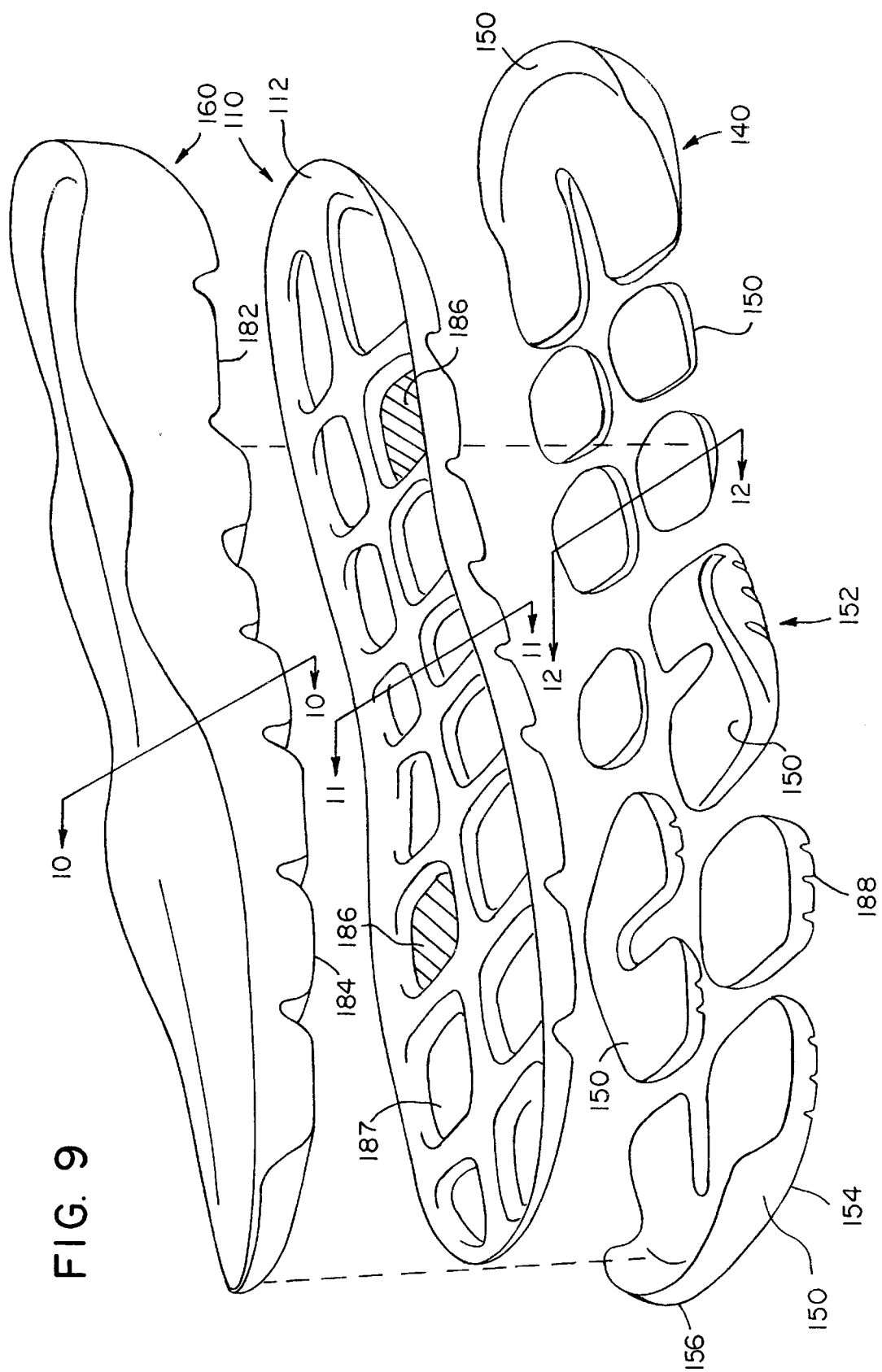
FIG. 9 is an exploded top left side perspective view of a midsole/contoured platform/outsole sole assembly manufactured from a second alternative embodiment of a contoured platform according to the present invention.

An alternative embodiment of a contoured platform 110 as shown in FIG. 9 includes a contoured surface with one or more raised portions in the form of a cavity 186, having a cavity bottom 187. The cavity bottom 187 may define an aperture, or alternatively, may be an integral continuous surface formed of the same material, or other material, as the remainder of the contoured platform 110. Such alternative embodiment may cover all or a portion of the sole of the footwear article.

In one embodiment, a lateral peripheral flange 16 that has an exterior flange surface 18 and an interior flange surface 20 may also be included. Lateral peripheral flange 16 may completely surround the perimeter 22 of contoured platform 10 or may substantially or only partially surround the perimeter of a contoured platform as shown in FIG. 1.

Lateral peripheral flange 16 or edge may be positioned at an angle of greater than about 45°. In one embodiment, lateral peripheral flange is at an angle of greater than about 70° and in another embodiment at an angle of about 90°, as measured from an adjacent portion of contoured inner surface 12 to interior flange surface 20 of lateral peripheral flange 16. In other embodiments, the contoured platforms according to the present invention has the. exterior flange surface 18 shaped to serve as at least a portion of the exterior portion of a side of an article of footwear or sole assembly constructed using contoured platform 10.

A contoured platform for use in the construction of an article of footwear may be various lengths with respect to the foot of a wearer, a sole assembly, or an article of footwear. For example, a contoured platform may completely cover the area beneath the foot of a wearer or may alternatively cover only areas directly beneath certain portions of the foot of a wearer. Furthermore, a contoured platform may be level or sloped in an article of footwear or sole assembly. Additionally, a contoured platform may define one, two, three, or a plurality of orifices which may be of similar or drastically different size. As shown in FIGS. 1–4, a contoured platform that completely covers the area beneath the foot of a wearer such as contoured platform 10 may be divided into various sections or portions such as a metatarsal-phalangeal juncture portion 24; an arch portion 26; a heel portion 28; a phalangeal portion 30; and an end-of-toe portion 32. One embodiment of contoured platforms include a heel portion such as the heel portion 28 and an end-of toe portion such the end-of-toe portion 32 and the contoured platform extends from the heel portion to the end-of-toe portion such as contoured platform 10 as shown in FIGS. 1–4. Other embodiments of contoured platforms include an arch portion and a metatarsal-phalangeal juncture portion and the contoured platforms extend from at least the arch portion to at least the metatarsal-phalangeal juncture portion, which may have one or more integral raised portions 15, as shown in FIGS. 1,2 and 5. It has been surprisingly and unexpectedly discovered that by including a contoured platform which extends from at least the arch portion to the metatarsal-phalangeal juncture in an article of footwear, the article of footwear has an added feeling of "lift" or toe-off propulsion when worn.

Still other embodiments of contoured platforms include a heel portion and a metatarsal-phalangeal juncture portion, and the contoured platforms extend from at least the heel portion to at least the metatarsal-phalangeal juncture portion. Yet other embodiments of contoured platforms include an end-of-toe portion and an arch portion and the contoured platforms extend from at least the end-of-toe portion to at least the arch portion. Still other embodiments of contoured platforms include a phalangeal portion and a heel portion, and the platforms extend from at least the heel portion to at least the phalangeal portion.

Some embodiments of contoured platforms such as that shown in FIGS. 1–4 include metatarsal-phalangeal juncture portion 24. In some embodiments, the contoured platform 10 has increased flexibility at metatarsal-phalangeal juncture portion 24 due to the inclusion of raised portions 15 in the shape of grooves. Although flexibility may be imparted to the contoured platform in a variety of ways, in more preferred contoured platforms such as contoured platform 10, contoured outer surface 14 defines a groove 34 or grooves in metatarsal-juncture portion 24 which may intersect in certain embodiments of contoured platforms. Groove 34, as best shown in FIG. 6, is may be formed to serve as at least a portion of the exterior bottom surface 36 of an article of footwear 38 or sole assembly 40 manufactured therefrom. Groove 34 provides flexibility and is a flexural zone or hinge in metatarsal-phalangeal juncture portion 24 of contoured platform 10 and to articles of footwear 38 and sole assemblies 40 made therefrom. Contoured platforms such as contoured platform 10 may include one or more phalangeal grooves 42 and/or one or more heel groove(s) 44 that impart flexibility to other parts of contoured platform 10 and articles of footwear and sole assemblies manufactured from such contoured platforms.

Various parts of the contoured outer surface of the contoured platform may be formed or shaped to serve as an exterior portion of the bottom surface of an article of footwear or sole assembly. For example, as shown in FIG. 6, contoured outer surface 14 of contoured platform 10 surface is formed to serve as exterior bottom surface 36 of article of footwear 38 or sole assembly 40. As shown in FIG. 6, arch portion 26, parts of heel groove 44 of heel portion 28, and grooves 34 and 42 of metatarsal-phalangeal juncture portion 24 and phalangeal portion 30 are shaped to serve as exterior bottom surface 36 of article of footwear 38 or sole assembly 40. Although it is not required that any part of a contoured platform be shaped or formed to serve as an exterior bottom surface of an article of footwear or sole assembly, in some embodiments of the contoured platforms at least a portion of the outer surface of the contoured platform is formed to serve as a portion of the exterior bottom surface of an article of footwear or sole assembly.

Although some embodiments of contoured platforms have an outer contoured surface formed to serve as an exterior bottom surface of an article of footwear or sole assembly, more preferred articles of footwear include outer contoured surfaces configured to have one, two, three or more outsole components, preferably with treads, attached to them. In some embodiments, at least 50 percent of the outer surface of the contoured platform is configured to have outsole components attached to it although the percentage can be either lower or higher than this. For example, in some contoured platforms, the percentage of the outer surface of the contoured platform configured to receive outsole components may be at least 75 percent, at least 90 percent, or at least 95 percent. In other contoured platforms, all or substantially all the outer surface of the contoured platform is configured to have an outsole component or components attached thereto. Areas of outer contoured surfaces configured to receive outsole components may optionally be bordered on at least one side by a raised ridge 46 as shown in FIG. 2. For example, contoured outer surface 14 of contoured platform 10 has at least four recessed areas 48 bordered by ridges 46 configured to receive separate outsole components 50 which are included in article of footwear 38 and sole assembly 40 shown in FIGS. 5 and 6. Other embodiments of contoured platforms include outer contoured surfaces shaped to receive outsole components in the heel portion; in the metatarsal-phalangeal juncture portion, in an area surrounding a groove in the metatarsal-phalangeal juncture portion; in the phalangeal portion; and in the end-of-toe portion of a contoured platform.

Figure 7:
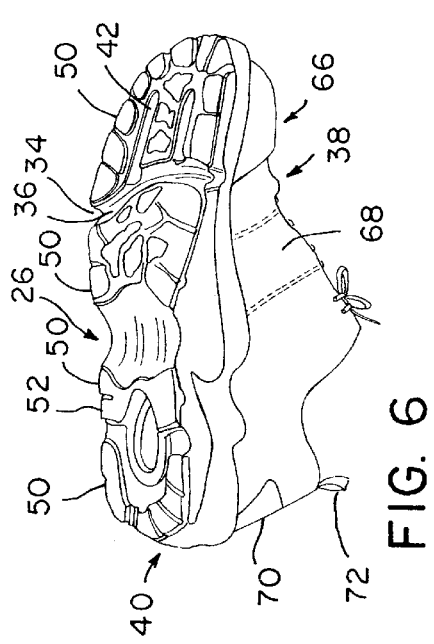
FIG. 7 is a right side view of the article of footwear shown in FIG. 6.
Figure 8:
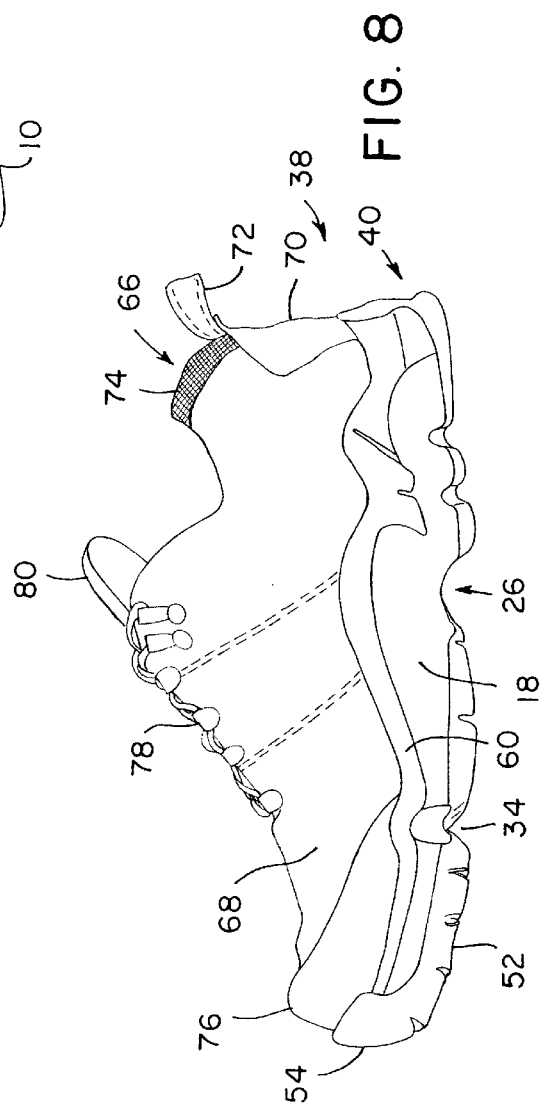
FIG. 8 is left side view of the article of footwear shown in FIG. 6.

As shown in FIG. 6, separate outsole components 50 may collectively make up outsole 52 of article of footwear 38 and sole assembly 40. In some articles of footwear and sole assemblies, separate outsole components are unattached to each other while in others at least two separate outsole pieces are connected to each other by at least one narrow bridging section. Some embodiments of outsoles for construction of articles of footwear and sole assemblies that contain contoured platforms include at least one toe piece such as toe piece 54 as shown in FIGS. 7 and 8. In other embodiments of contoured platforms, toe piece 54 of outsole 52 extends over end-of-toe portion 32 of contoured platform 10 to form an exterior surface of a front side 56 of article of footwear 38 or sole assembly 40. In other articles of footwear and sole assemblies such as those shown in FIGS. 5–8 and noted above, exterior flange surface 18 of lateral peripheral flange 16 is shaped to serve as at least a portion of the exterior side surface 58 of article of footwear 38 or sole assembly 40 constructed using contoured platform 10. Therefore, in some articles of footwear and sole assemblies, at least a portion of a contoured platform and at least a portion of an outsole may form external side surfaces.

Alternatively, contoured platform 10, in any of the embodiments heretofore described, may be entirely enclosed within the article of footwear. The contoured platform may be entirely enclosed within the midsole portion. Alternatively, the contoured platform may have one side entirely covered by the midsole, and the other side entirely covered by the outsole. In such an embodiment, the lateral peripheral flange 16, as shown in FIG. 4, may be enclosed within the article of footwear or alternatively, may be exposed in the assembled article of footwear.

In some embodiments of articles of footwear and sole assemblies such as those shown in FIGS. 5–8, at least a portion of contoured inner surface 12 of a contoured platform 10 as shown in FIGS. 1–4 is attached to optional midsole 60. Top surface 62 of midsole 60 may be contoured or smooth. Some embodiments of midsoles for use in articles of footwear and sole assemblies may define one or more grooves such as midsole grooves 64 as shown in FIG. 5 which help to maintain flexibility in a sole assembly or article of footwear constructed therefrom. In some embodiments, midsoles for use in articles of footwear or sole assemblies of the present invention include portions made of a spongy material including, but not limited to, a gel, a gas, a liquid, a foam, or mixtures of these materials. Thus, the midsole or portions thereof may be made of a material such as an elastomer, rubber, or a foam that is compressible and insulates the foot of a wearer from impacts normally associated with walking or running activity. In some embodiments foams are made of materials such as, but not limited to, ethylene vinyl acetate, polyurethane, polyolefin elastomers, and combinations of these materials. In one embodiment, sole assemblies and articles of footwear include a contoured inner surface of a contoured platform that will define at least one, and optionally more than one, depression adapted to hold a cushioning substance that projects downward from a midsole such as an extending piece of a foam polymer.

An article of footwear such as article of footwear 38 shown in FIGS. 6–8 typically includes upper main body 66 and sole assembly 40, sole 30 assembly 40 made up of outsole 52 and any contoured platform according to the present invention such as contoured platform 10. Any of the contoured platforms, sole assemblies, or outsoles may be used to construct an article of footwear according to the present invention. Sole assemblies such as sole assembly 40 shown in FIG. 5 may thus be separately constructed and assembled with various types of upper main body to construct an article of footwear.

The upper main body may contain various features not critical to the construction of an article of footwear. For example, both sole assemblies and articles of footwear according to the present invention may include one or more interstitial layers located between the contoured platform and the outsole or between the contoured platform and midsole. Such interstitial layers may be made of various materials including, but not limited to textile materials. Textile materials for use as an interstitial layer may be decorated to provide a metallic or shiny holographic or lenticular appearance to enhance the overall appeal of an article of footwear especially when the interstitial layer is visible through an aperture in the outsole and/or contoured platform. Furthermore, because the contoured platforms of the present invention allow for the construction of various sole assemblies such as those designed for use in athletic shoes and those designed for use in hiking or boots, articles of footwear designed for various purposes may be accomplished using an appropriate upper main body. Some of the features typically present in an upper main body are shown in FIGS. 6–8. For example, upper main body 66 of article of footwear 38 includes the following components: main body vamp 68; heel cover 70; tab 72; Achilles pad 74; toe cover piece 76; shoe- or bootlace tabs 78; and tongue 80. As will be apparent to those skilled in the art, various ornamental and structural features may be included in upper main body 66 in addition to the above features.

Figure 10:
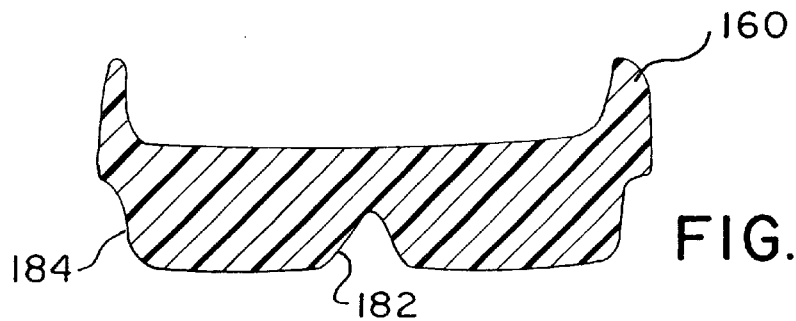
FIG. 10 is a cross-sectional view of the midsole taken along line 10—10 of the midsole/contoured platform/outsole sole assembly shown in FIG. 9.
Figure 11:
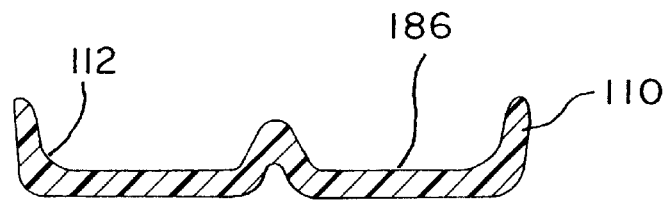
FIG. 11 is a cross-sectional view of the contoured platform taken along line 11—11 of the midsole/contoured platform/outsole sole assembly shown in FIG. 9.
Figure 12:
FIG. 12 is a cross-sectional view of the outsole taken along line 12—12 of the midsole/contoured platform/outsole sole assembly shown in FIG. 9.

As shown in FIG. 9, sole assembly 140 is constructed from a second alternative embodiment of contoured platform 110, outsole components 150 making up outsole 152, and midsole 160. As shown in FIG. 9, bottom surface 182 of midsole 160 has protuberances or projections 184 which fit into corresponding cavities or depressions 186 defined by contoured inner surface 112 of contoured platform 110. All, some, or none, of projections 184 may be constructed from various elements such as, but not limited to gels, gases, and microballoons to provide additional cushioning to sole assembly 140. Gases for use in projections 184 may include, but are not limited to, air and rare gases. Separate cross-sectional views through midsole 160, contoured platform 110 and outsole 152 of sole assembly 140, respectively shown in FIGS. 10, 11, and 12, demonstrate that projections 184 may optionally make midsole 160 considerably thicker than contoured platform 110 or outsole 152.

Figure 13:
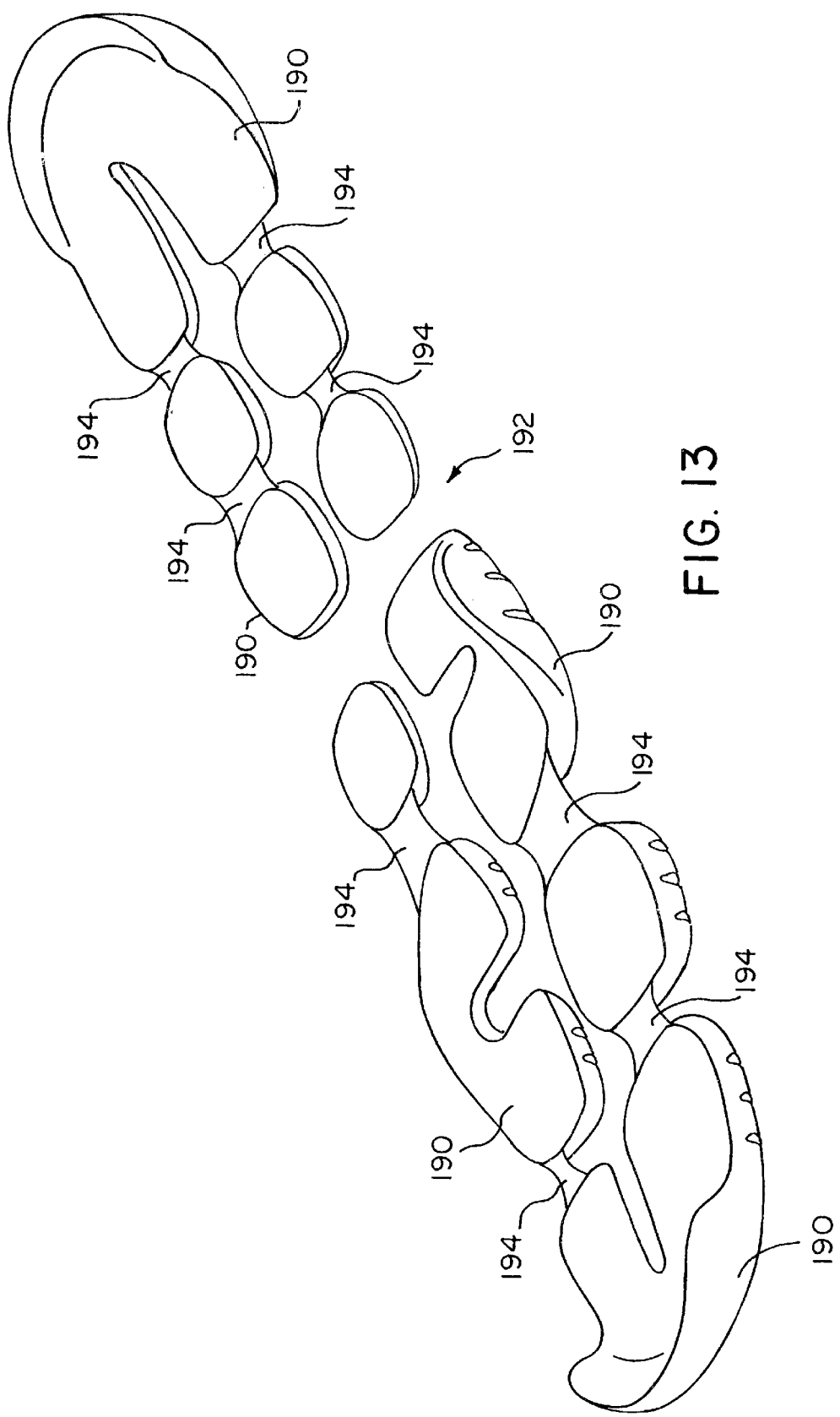
FIG. 13 is a top left side perspective view of an alternative embodiment of an outsole for use in the midsole/contoured platform/outsole sole assembly shown in FIG. 9.

Among other components, outsole 152 of sole assembly 140 includes treads 188 and toe piece 154 which serves as exterior front surface 156 of sole assembly 140 or an article of footwear constructed from sole assembly 140. Referring now to FIG. 13, an alternative embodiment of an outsole for use in sole assembly 140 is shown. Outsole components 190 of alternative outsole 192 are connected by optional narrow bridging sections 194 as previously described.

Figure 14:
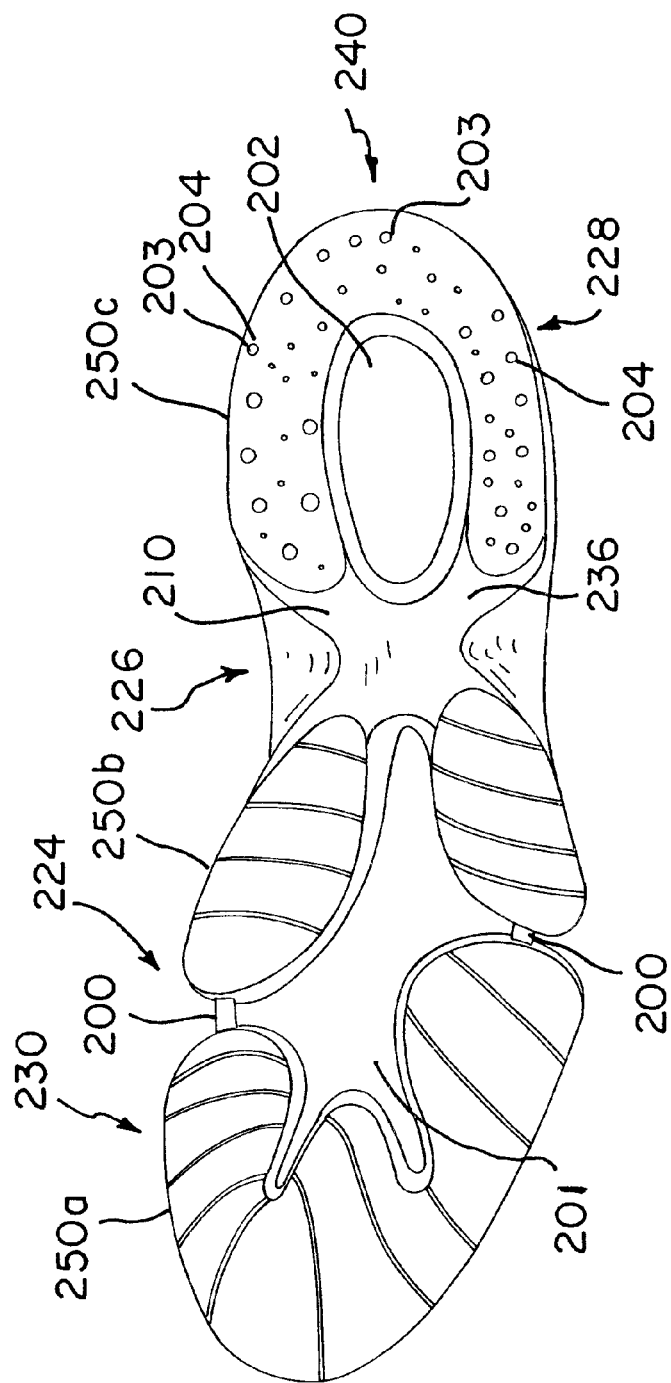
FIG. 14 is a bottom view of a contoured platform/outsole sole assembly manufactured from a third alternative embodiment of a contoured platform according to the present invention.

A sole assembly 240 constructed from a third alternative contoured platform 210 is shown in FIGS. 14 and 15. Sole assembly 240 contains at least three separate outsole components 250a, 250b, and 250c making up outsole 252. Outsole components 250a and 250b are attached by narrow bridging section 200, but are separate from and unattached to third outsole component 250c located in heel portion 228 of contoured platform 210. As shown in FIG. 14, arch portion 226 of contoured platform 210 is formed to serve as a portion of exterior bottom surface 236 of sole assembly 240 or articles of footwear constructed therefrom. Contoured platform 210 defines a first and second large aperture 201 and 202. First large aperture 201 provides increased flexibility in metatarsal-phalangeal juncture portion 224 and phalangeal portion 230 of sole assembly 240, contoured platform 210 and articles of footwear constructed therefrom. Third outsole component 250c defines a plurality of orifices 203 filled by numerous complimentary projections 204 extending from contoured surface 210 which help to secure third outsole component 250c to contoured platform 210. Contoured inner surface 212 of contoured platform 210 has narrow bridging section 205 similar to those of outsole 252 connecting parts of contoured platform 210 in metatarsal-phalangeal juncture portion 224 as shown in FIG. 15.

FIG. 16 shows how three different outsole components 350a, 350b, and 350c are placed on contoured outer surface 314 of fourth alternative contoured platform 310 to produce sole assembly 340. As shown in FIGS. 16–18, contoured platform 310 defines two large apertures 301 and 302. Additionally, contoured inner and outer surfaces 312 and 314 define a plurality of orifices 306 produced during an injection-molding or compression-molding process. Orifices 306 assist in securely attaching outsole components 350a, 350b, and 350c to contoured outer surface 314 of contoured platform 310. As shown in FIGS. 16 and 17, contoured outer surface 314 defines metatarsal-phalangeal juncture portion groove 334; phalangeal grooves 342; and arch portion 326 designed to serve as exterior bottom surface 336 of sole assembly 340 or articles of footwear made therefrom.

As shown in FIGS. 19 and 20, various alternative embodiments of contoured platforms and sole assemblies constructed therefrom such as contoured platform 410 and sole assembly 440 may include more than one groove 434 in metatarsal-phalangeal juncture portion 424 to impart varied flexibility to contoured platform 410 as compared to other contoured platforms. Furthermore, contoured platforms according to the present invention and sole assemblies constructed therefrom may be configured to include additional components such as reinforced composite textiles. For example, the contoured platform 510/outsole 552 sole assembly 540 shown in FIGS. 21 and 22 includes a reinforcing composite textile 507 that covers aperture 508 in arch portion 526 of contoured platform 510.

Figure 23:
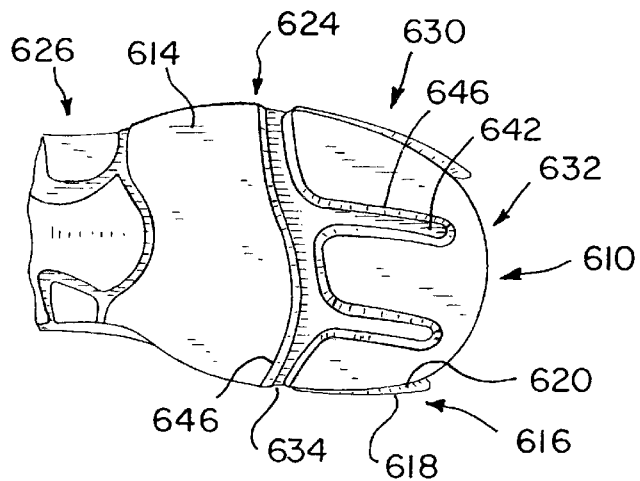
FIG. 23 is a bottom view of a seventh alternative embodiment of a contoured platform according to the present invention.

Referring now to FIG. 23, a bottom view of a contoured platform 610 according to a seventh alternative embodiment has an arch portion 626; a metatarsal-phalangeal juncture portion 624 defining groove 634; a phalangeal portion 630 defining phalangeal grooves 642; and an end-of toe portion 632. As shown in FIG. 23, contoured platform 610 extends from at least arch portion 626 to end of toe portion 632 and metatarsal groove 634 provides flexibility to contoured platform 610 and sole assemblies and articles of footwear made therefrom. Contoured platform 610 includes a lateral peripheral flange 616 having interior 620 and exterior 618 surfaces. Contoured platform 610 also includes a contoured outer surface 614. At least a portion of contoured outer surface 614 is adapted to receive outsole components, and ridges 646 preferably surround areas shaped to receive such components.

Figure 24:
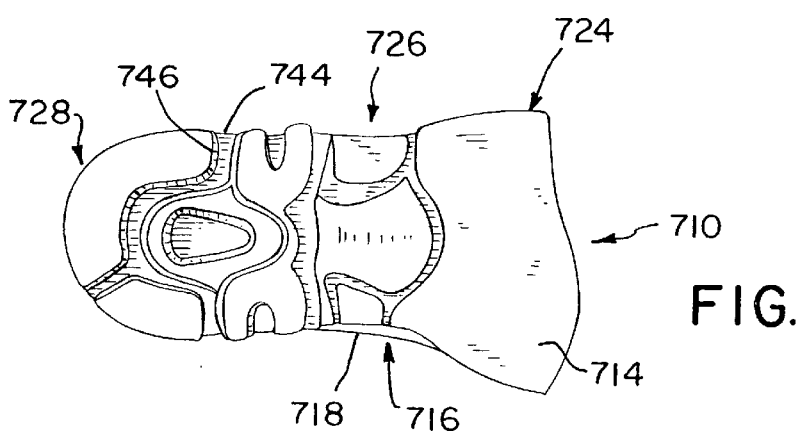
FIG. 24 is a bottom view of an eight alternative embodiment of a contoured platform according to the present invention.

Referring now to FIG. 24, and eighth alternative embodiment of a contoured platform 710 includes a contoured outer surface 714 and generally extends from a metatarsal-phalangeal juncture portion 724 to a heel region 728. Contoured platform 710 also includes an arch portion 726 adapted to serve as a bottom exterior surface for a sole assembly or article of footwear constructed from contoured platform 710. Contoured platform 710 further includes lateral peripheral flange 716 having an exterior surface 718 and interior surface (not shown) and a heel groove 744. Contoured platform 710 is adapted to receive outsole components which are preferably positioned in areas at least partially surrounded by ridges 746.

The contoured platforms of the present invention may be made of various materials including, but not limited to, synthetic plastic and polymeric materials such as, but not limited to, thermoplastic olefins, thermoplastic polyurethanes, thermoplastic rubber, thermoplastic EVA, and copolymeric materials such as Nylon12/thermoplastic urethane materials and materials such as Peebax™ brand polyurethane/polyamide injection-molding material; and plastics or other materials used in injection molding or compression molding processes such as ionomer materials, including, but not limited to Surlyn® brand ionomer resin available from E.I. Dupont de Nemours (Wilmington, Del.). Furthermore, the contoured platforms of the present invention may be made of single or multiple materials which may include, for example a textile material or a composite material in addition to a plastic or elastomeric material. Composite materials for use in a contoured platform include fabrics impregnated with thermoset or thermoplastic resins. In some embodiments, the contoured platforms of the present invention are made of a plastic that provides both rigidity and flexibility to the platform such as injection-molded plastic or thermoplastic materials. The contoured plastic may thus be made of a relatively non-compressible material. The thickness of contoured platforms varies over various portions of the platform to provide varying rigidities and flexibilities to such platforms. However, some embodiments of contoured platforms will have a fairly uniform to uniform thickness throughout the various portions of the platform.

Outsole components for use in the sole assemblies and articles of footwear according to the present invention may be made of various materials, such as, but not limited to, polyolefin elastomers, thermoset polyurethanes, thermoset rubber, natural and synthetic rubber, and combinations of these materials.

The contoured platforms for use in the present invention may be made by various techniques as will be apparent to those skilled in the art. Generally, the contoured platforms may be formed using standard injection-molding or compression-molding techniques. In one embodiment, a contoured platform is prepared by injecting a material suitable for injection-molding into a mold configured to produce the contoured platform with the desired shape and characteristics. After the material has filled the mold, the material is typically cooled and then removed from the mold. This simple procedure may be modified to include adding composite or textile materials to the platform, and the molded product may be subjected to finishing treatments to remove flashing from the molding process or to add other desirable features as will be apparent to those skilled in the art.

It has been discovered that the outsole component(s) may be placed directly into the mold prior to injection of the injection-molding material in cases where the contoured platform is made using injection molding techniques. In some embodiments, such outsole components will be pre-treated to enhance bonding between the contoured platform and the outsole component. Although various pretreating agents may be used to enhance the bonding between the contoured platform and outsole components, preferred methods of pre-treating outsole components include halogenation such as bromination or chlorination; Satrite® brand etching primer (a chlorinating primer available from Upaco, Nassua, N. H.); special primers for use with polyolefin elastomers; pre-treatment with solvents such as, but not limited to, methyl ethyl ketone; and various adhesive systems such as solvent-based and hot-melt adhesives. Conventional roughing and bonding procedures may also be used in cases where the outsole components are not placed in the mold prior to injection of the injection-molding material.

Another method for making contoured platforms according to the present invention includes compression molding.

In such a method, a precut sheet of plastic or composite material utilizing a thermoplastic resin bonding agent is typically placed on a series of pins in a compression mold designed to form a contoured platform according to the invention. The method also includes closing the compression mold and applying pressure to produce the contoured platform. In one such embodiment, a midsole, an outsole, or both may be placed in the mold prior to compression to provide a midsole/contoured platform assembly, an outsole/contoured platform assembly, or a midsole/contoured platform/outsole assembly.

A further method for manufacturing articles of footwear encompassing the contoured platform of the present invention includes direct injection molding, also known as direct attach, typically involving polymeric materials well known in the art such as polyurethane. Direct injection molding techniques are well known in the art.

Figure 26:
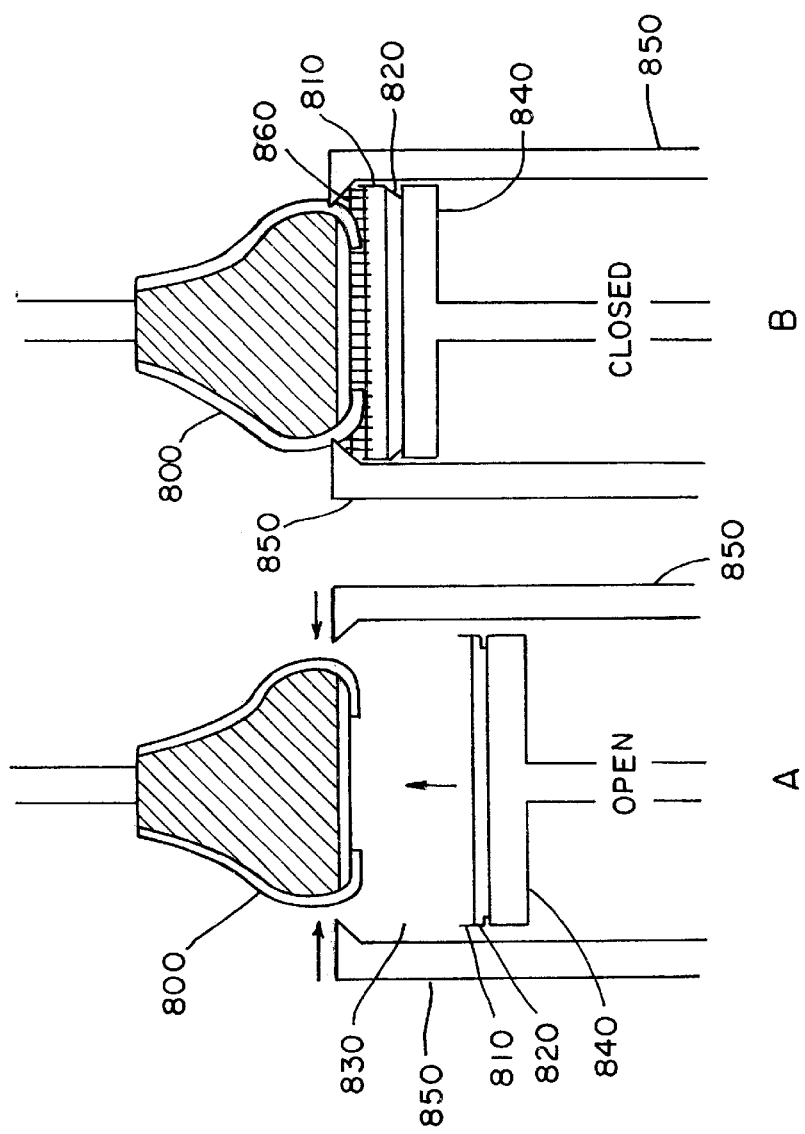
FIGS. 26a–26b illustrates the direct injection process of forming an article of footwear containing a contoured platform of the present invention.

One such embodiment of direct injection molding is shown in FIG. 26A and FIG. 26B. As shown in FIGS. 26A and 26B, a lasted shoe upper 800 is positioned a fixed distance from a contoured platform 810 that is bonded to an outsole 820 forming a cavity 830 of a desired thickness. The cavity 830 defines the space that will be injected with a polymeric material to form the midsole. The thickness of the midsole may be of any desired thickness. The contoured platform 810 and the attached outsole 820 are located on a sole mold 840. Either or both of the sole mold 840 and the lasted upper 800 may be movable so that the cavity 830 defined between them may be varied. After the sole mold 840 and lasted upper 800 are positioned as desired, a mechanical pair of side molds 850 close the sides of the cavity 830 to firmly grip the edges of the lasted upper 800 and contoured platform 810, completely sealing cavity 830. As shown in FIG. 26B, the cavity 830 is injected with a polymeric material to form the midsole 860. The polymeric material may be any such material well known in the art, for example, a two part polyurethane system. The midsole 860 acts to fuse the lasted upper 800 and the contoured platform 810 together to form the article of footwear. The finished article of footwear is then removed.

Alternatively, if the contoured platform is to be completely encased in the midsole, the contoured platform can be suspended within the cavity between the outsole and the lasted upper, and the outsole positioned on the sole mold.

It should be understood that the invention is not limited to the particular construction and arrangement of parts herein illustrated and described, but embraces such modified forms as come within the scope of the following claims.

What is claimed is:

1. A contoured platform for use in the construction of an article of footwear, comprising:
   (a) a contoured inner surface;
   (b) a contoured outer surface:
   (c) a metatarsal-phalangeal juncture portion;
   (d) a phalangeal portion; and
   (e) an arch portion,
   wherein the contoured platform is formed of a flexible, non-compressible plastic material extending from at least the arch portion to at least the phalangeal portion, and the contoured outer surface of the contoured platform comprises at least one raised portion that defines a groove extending laterally across the metatarsal-phalangeal juncture portion of the contoured platform providing flexibility to the metatarsal-phalangeal juncture portion, and further wherein the arch portion of the contoured outer surface and the groove extending laterally across the metatarsal-phalangeal juncture portion of the contoured platform are configured to serve as portions of an exterior bottom surface of a sole assembly and an article of footwear.

2. The contoured platform of claim 1, wherein the contoured platform further comprises a heel portion, and the contoured platform extends from at least the heel portion to the phalangeal portion.

3. The contoured platform of claim 1, wherein the contoured platform further comprises an end-of-toe portion and the contoured platform extends from at least the arch portion to the end-of-toe portion.

4. The contoured platform of claim 1, wherein the contoured platform further comprises a heel portion and an end-of-toe portion and the contoured platform extends from the heel portion to the end-of-toe portion.

5. The contoured platform of claim 4, wherein the contoured outer surface of the contoured platform defines at least four separate recessed areas configured to receive outsole components.

6. The contoured platform of claim 5, wherein the at least four recessed areas configured to receive outsole components are bordered on at least one side by a ridge.

7. The contoured platform of claim 1, wherein the contoured inner and outer surfaces of the contoured platform define a plurality of orifices that extend through the contoured platform.

8. The contoured platform of claim 1, wherein the contoured platform is made of injection-molded or compression-molded plastic.

9. The contoured platform of claim 1, wherein the contoured platform comprises a first recessed area between the groove in the metatarsal-phalangeal juncture portion and the arch portion.

10. The contoured platform of claim 9, wherein the arch portion adjacent to the first recessed area comprises a ridge bordering the first recessed area, further wherein the groove in the metatarsal-phalangeal juncture portion adjacent to the first recessed area comprises a ridge that borders the first recessed area.

11. The contoured platform of claim 1, wherein the contoured outer surface of the contoured platform defines at least two grooves in the phalangeal portion of the contoured platform that intersect the groove in the metatarsal-phalangeal juncture portion of the contoured platform.

12. The contoured platform of claim 1, wherein the groove defined by the contoured outer surface in the metatarsal-phalangeal juncture portion of the contoured platform comprises a ridge bordering a recessed area in the phalangeal portion of the contoured platform.

13. The contoured platform of claim 1, further comprising at least one lateral peripheral flange comprising an interior flange surface and an exterior flange surface, the exterior flange surface of the lateral peripheral flange configured to serve as an exterior side surface of an article of footwear constructed therefrom.

14. A sole assembly, comprising the contoured platform of claim 1, and an outsole attached to the contoured outer surface of the contoured platform, wherein the outsole comprises at least one outsole component and the arch portion of the contoured outer surface and the groove extending laterally across the metatarsal-phalangeal juncture portion of the contoured platform comprise at least a part of the exterior bottom surface of the sole assembly.

15. The sole assembly of claim 14, wherein the outsole comprises at least two separate unattached pieces.

16. The sole assembly of claim 15, wherein the outsole comprises at least three separate unattached pieces.

17. The sole assembly of claim 14, wherein the outsole comprises at least two separate pieces and at least one narrow bridging section, wherein at least two of the separate pieces of the outsole are attached to each other by the narrow bridging section.

18. The sole assembly of claim 14, further comprising a midsole attached to the contoured inner surface of the contoured platform.

19. The sole assembly of claim 18, wherein a top surface of the midsole defines one or more grooves in a metatarsal-phalangeal portion of the midsole.

20. The sole assembly of claim 18, wherein the midsole comprises a compressible material.

21. The sole assembly of claim 18, wherein the midsole comprises a cushioning substance that fits into a corresponding contour on the inner surface of the contoured platform.

22. The sole assembly of claim 21, wherein the cushioning substance is selected from the group consisting of a foam, a gel, a gas, a liquid, a spongy material, and mixtures thereof.

23. An article of footwear, comprising the sole assembly of claim 18 and an upper main body attached to the sole assembly.

24. An article of footwear, comprising:
(a) an exterior bottom surface;
(b) an exterior side surface;
(c) an upper main body; and
(d) a sole assembly attached to the upper main body, the sole assembly comprising:
  (i) an outsole having an interior surface and an exterior surface, wherein the exterior surface of the outsole forms at least a portion of the exterior bottom surface of the article of footwear; and
  (ii) a contoured platform formed of a flexible, non-compressible plastic material, the contoured platform comprising: a contoured inner surface; a contoured outer surface; a metatarsal-phalangeal juncture portion; a phalangeal portion; an arch portion; and at least one peripheral flange, the peripheral flange comprising an interior flange surface and an exterior flange surface,
    wherein at least a portion of the contoured outer surface of the contoured platform is attached to the interior surface of the outsole, further wherein the contoured platform extends from at least the arch portion to at least the phalangeal portion, and further wherein the arch portion comprises at least a portion of the exterior bottom surface of the article of footwear, and still further wherein the exterior flange surface of the peripheral flange of the contoured platform comprises at least a portion of the exterior side surface of the article of footwear.

25. The article of footwear of claim 24, wherein the contoured outer surface of the contoured platform defines a groove extending laterally across the metatarsal-phalangeal juncture portion providing flexibility to the metatarsal-phalangeal juncture portion, and further wherein the groove extending laterally across the metatarsal-phalangeal juncture portion of the contoured outer surface comprises at least a portion of the exterior bottom surface of the article of footwear.

26. The article of footwear of claim 25, wherein the contoured outer surface of the contoured platform comprises a first recessed area between the groove in the metatarsal-phalangeal juncture portion and the arch portion, and the first recessed area is attached to the interior surface of the outsole.

27. The article of footwear of claim 26, wherein the arch portion adjacent to the first recessed area comprises a ridge bordering the first recessed area, and further wherein the groove in the metatarsal-phalangeal juncture portion adjacent to the first recessed area comprises a ridge that borders the first recessed area.

28. The article of footwear of claim 25, wherein the contoured outer surface of the contoured platform defines at least two grooves in the phalangeal portion of the contoured platform that intersect the groove in the metatarsal-phalangeal juncture portion of the contoured platform.

29. The article of footwear of claim 25, wherein the groove defined by the contoured outer surface in the metatarsal-phalangeal juncture portion of the contoured platform comprises a ridge bordering a recessed area in the phalangeal portion of the contoured platform, and the interior surface of the outsole is attached to the recessed area in the phalangeal portion of the contoured platform.

30. The article of footwear of claim 24, wherein the contoured platform further comprises a heel portion, and the contoured platform extends from at least the heel portion to at least the phalangeal portion.

31. The article of footwear of claim 30, wherein at least a portion of the heel portion of the contoured platform comprises a portion of the exterior bottom surface of the article of footwear.

32. The article of footwear of claim 24, wherein the contoured platform further comprises an end-of-toe portion, and the contoured platform extends from at least the arch portion to the end-of-toe portion.

33. The article of footwear of claim 24, wherein the contoured platform comprises a heel portion and an end-of-toe portion, and the contoured platform extends from the heel portion to the end-of-toe portion.

34. The article of footwear of claim 33, wherein at least a portion of the heel portion of the contoured platform comprises a portion of the exterior bottom surface of the article of footwear.

35. The article of footwear of claim 33, wherein the contoured outer surface of the contoured platform defines a groove in the heel portion of the contoured platform and the groove in the heel portion of the contoured outer surface comprises a portion of the exterior bottom surface of the article of footwear.

36. The article of footwear of claim 24, wherein the contoured outer surface of the contoured platform defines at least four separate recessed areas attached to the interior surface of the outsole.

37. The article of footwear of claim 36, wherein the recessed areas of the contoured outer surface of the contoured platform are bordered on at least one side by a ridge in the contoured outer surface of the contoured platform.

38. The article of footwear of claim 24, wherein the contoured inner and outer surfaces of the contoured platform define an orifice that extends through the contoured platform.

39. The article of footwear of claim 24, wherein the contoured platform is made of injection-molded or compression-molded plastic.

40. The article of footwear of claim 24, wherein the outsole comprises at least two separate unattached pieces.

41. The article of footwear of claim 24, wherein the outsole comprises at least three separate unattached pieces.

42. The article of footwear of claim 24, wherein the outsole comprises at least two separate pieces and at least one narrow bridging section, wherein at least two of the separate pieces of the outsole are attached to each other by the narrow bridging section.

43. The article of footwear of claim 24, wherein the sole assembly further comprises a midsole attached to the contoured inner surface of the contoured platform.

44. The article of footwear of claim 43, wherein the midsole defines one or more grooves in a metatarsalphalangeal portion of the midsole.

45. The article of footwear of claim 43, wherein the midsole comprises a compressible material.

46. The article of footwear of claim 43, wherein the midsole comprises a cushioning substance that first into a corresponding contour on the inner surface of the contoured platform.

47. The article of footwear of claim 46, wherein the cushioning substance is selected from the group consisting of a foam, a gel, a gas, a liquid, a spongy material, and mixtures thereof.

* * * * *

UNITED STATES PATENT AND TRADEMARK OFFICE
CERTIFICATE OF CORRECTION

PATENT NO. : 6,412,196 B1
DATED : July 2, 2002
INVENTOR(S) : Alexander L. Gross

It is certified that error appears in the above-identified patent and that said Letters Patent is hereby corrected as shown below:

Column 3,
Line 30, delete the word "is" at the end of the line and replace it with -- in --.

Column 4,
Line 13, delete the word "anther" and replace it with -- another --.

Column 5,
Line 1, delete the first word in the sentence "On" and replace it with -- One --.

Column 7,
Line 45, delete the word "eight" and replace it with -- eighth --.
Line 51, delete the word "illustrates" and replace it with -- illustrate --.

Column 8,
Line 46, delete the words "may occur at for" and replace them with -- may occur --.

Column 9,
Line 8, delete the period after the word "the." and replace it with -- the --.
Line 30, delete the words "such the" and replace them with -- such that the --.
Line 66, delete the words "is may be" and replace them with -- may be --.

Column 13,
Line 49, delete the word "and" and replace it with -- an --.

Column 20,
Line 2, delete the word "first" and replace it with -- fits --.

Signed and Sealed this

Nineteenth Day of November, 2002

Attest:

*Attesting Officer*

JAMES E. ROGAN
*Director of the United States Patent and Trademark Office*